United States Patent [19]

Spruiell

[11] 3,731,940

[45] May 8, 1973

[54] ELASTOMER SEAL WITH A PLURALITY OF ANNULAR RIBS FOR A ROTATING SHAFT OF A CENTRIFUGAL PUMP OR THE LIKE

[76] Inventor: Walter L. Spruiell, 210 W. Texas, Iowa Park, Tex. 76367

[22] Filed: Aug. 6, 1971

[21] Appl. No.: 169,616

[52] U.S. Cl. .................. 277/12, 415/173 A, 415/204
[51] Int. Cl. ......................... F04d 29/08, F04d 29/22
[58] Field of Search ..................... 415/173 A; 277/12, 277/25, 67, 133, 207, 208

[56] References Cited

UNITED STATES PATENTS

| 3,028,181 | 4/1962 | Thompson et al. | 277/12 |
| 2,210,723 | 8/1940 | Kosatka | 415/173 A |
| 1,931,733 | 10/1933 | Leibing | 277/25 |

FOREIGN PATENTS OR APPLICATIONS

| 341,038 | 10/1959 | Switzerland | 277/25 |

*Primary Examiner*—Henry F. Raduazo
*Attorney*—Wayland D. Keith

[57] ABSTRACT

An elastomer seal for a rotating shaft of a centrifugal pump which has annular ribs and is so cupped as to form a seal when the centrifugal pump is in static condition, which also seals at various slow speeds until the pump attains sufficient centrifugal pumping speed to divert the fluid being pumped away from the shaft, and with the annular ribs forming seals with the wall of the pump housing in sequential relation as the speed of rotation of the shaft decreases and becomes static.

2 Claims, 5 Drawing Figures

PATENTED MAY 8 1973 3,731,940

INVENTOR.
WALTER L. SPRUIELL
BY
Wayland D. Keith
HIS AGENT

ELASTOMER SEAL WITH A PLURALITY OF ANNULAR RIBS FOR A ROTATING SHAFT OF A CENTRIFUGAL PUMP OR THE LIKE

BACKGROUND OF THE INVENTION

This invention relates to improvements in seals for the rotating shafts of pumps, and more particularly to a seal which will seal effectively either while the pump is in static condition, or while the pump shaft is rotating slowly or is rotating at full speed.

The present seal is so constructed as to give efficient sealing at any speed at which the pump is operated, including and also while the pump is in static condition.

The present seal is of such construction that it will wear over a long period of time even when pumping mud and abrasives. Various seals and glands for pumps have been proposed heretofore, but these for the most part, relied on the tightness of the packing material around the shaft to prevent leakage of the hydraulic fluid from the pump.

The present invention provides a combination mechanical contact seals and fluid seal for the shaft, with the mechanical contact seal having at least three annular ribs thereon to perform a mechanical sealing action while the pump is in static condition, whereupon, the first annular rib of the elastomer seal will be held in resilient relation against the housing to form a sealing action. As the shaft rotates the elastomer seal, the centrifugal force will move the first annular elastomer rib out of contact with the housing and the second annular elastomer sealing rib will form a seal with the wall of the housing. As the speed is increased the centrifugal force will move the second annular rib out of contact with the wall of the housing, but a third annular rib of the elastomer seal will be in sealing relation with the wall of the housing until the centrifugal force moves all the annular ribs out of contact with the housing, at which point the fluid within the pump or centrifugal fluid sealing housing will perform the sealing action between the impeller and the walls near the periphery so long as the impeller or the pump is rotating at the rated speed with the impeller.

OBJECTS OF THE INVENTION

An object of this invention is to provide a seal for a rotating shaft of a hydraulic pump or the like, wherein an elastomer seal performs a sealing action with the walls of the housing within the pump, when the pump is in static condition, which elastomer seal will move out of contact relation with the wall of the housing in a series of steps so as to prevent fluid moving along the shaft and passing into the bearings or leaking from the pump housing when the shaft and the impeller is rotated.

Another object of the invention is to provide a seal for a centrifugal pump, having multiple impellers and multiple fluid housings, wherein the elastomer seals will co-act with fluid seals and the impellers to seal the housing while the impeller is in static condition, and while the impeller is rotating slowly, before it attains the rated RPM.

A further object of the invention is to provide an elastomer seal which has at least three annular ribs on one side thereof, which ribs are so positioned as to disengage or engage the wall of the pump housing at various speeds of the rotation of the impeller shaft with the annular ribs of the elastomer seals successively disengaging from the wall of the pump housing as the speed of the shaft of the impeller increases and the next annular rib inward engaging the wall of the housing so as to present a wear surface on the seal at each stage of rotation so as to extend the life of the seal over a long period of time.

BRIEF DESCRIPTION OF THE DRAWINGS

With these objects in mind and others which will become manifest as the description proceeds, reference is to be had to the accompanying drawing in which like reference characters designate like parts in the several views thereof, in which.

PRIOR ART

Figure 1:
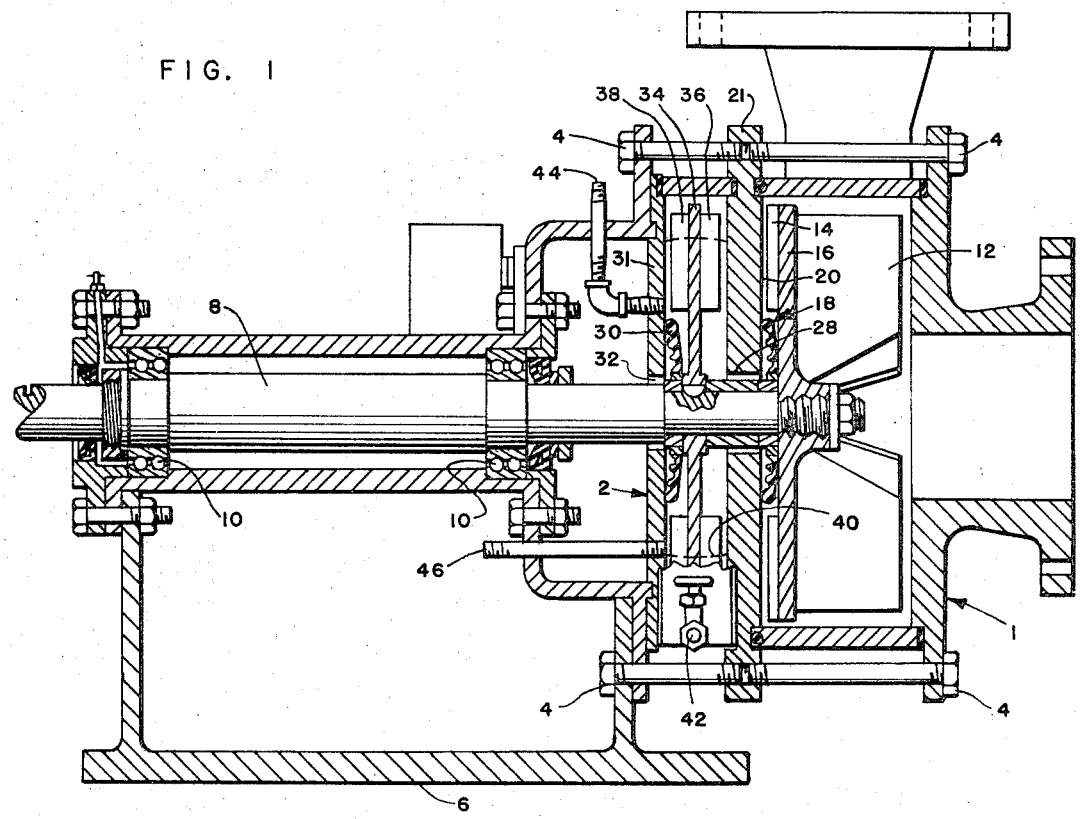
FIG. 1 is a longitudinal, sectional view through a centrifugal pump having an impeller therein, showing a fluid seal housing, with an impeller therein, mounted in axial relation with respect to the pump shaft, and showing elastomer seals in the pump housing and in the fluid seal housing, each which elastomer seal has a plurality of annular ribs on the face thereof.

The prior art includes several elastomer seals, such as Groot, U.S. Pat. No. 2 418 707; Gutmann, U.S. Pat. No. 2 140 356; Southam et al., U.S. Pat. No. 2 936 715; Wightman, U.S. Pat. No. 2 478 649; and Thompson, U.S. Pat. No. 3 028 181.

DESCRIPTION OF THE PREFERRED EMBODIMENT

With more detailed reference to the drawing, the numeral 1 designates generally a pump housing, and the numeral 2 designates generally the fluid seal housing. The pump housing and fluid seal housing are connected in end to end axial relation by means of bolts 4. The bolts 4 hold the individual housings together in sealing relation to prevent leakage therebetween and also hold the two housings together in such manner that either may be removed. The housings 1 and 2 are supported on a base 6 so as to form a centrifugal pumping unit which has a shaft 8 journaled in bearings 10. The shaft has a pump impeller 12 mounted thereon. A pump seal impeller 14 is mounted on plate 16 on the side opposite the pump impeller 12.

The function of these impellers is brought out in the above mentioned U.S. Pat. to Thompson, No. 3 028 181, however, the impellers, as described in this patent, perform the proper sealing action only when the pump is running at the rated RPM. When the pump is not running at the rated RPM the fluid will flow out of the pump housing 1 of the above designated patent to Thompson were it not for the proper static seals 18 and 30 around the shaft, as shown herein. Therefore, an elastomer seal, designated by the numeral 18, surrounds shaft 8, and is rotatable therewith, one of which seals 18 is within impeller housing 1, therefore, when the impeller 12 is static, the seal 18 will have the outer annular rib 22 thereof pressed into sealing relation with housing 1, as indicated in full outline, FIG. 2, and from a position indicated in dashed outline in FIG. 2 which will prevent leakage between the seal and the wall 20 of housing 1.

Figures 2, 3:
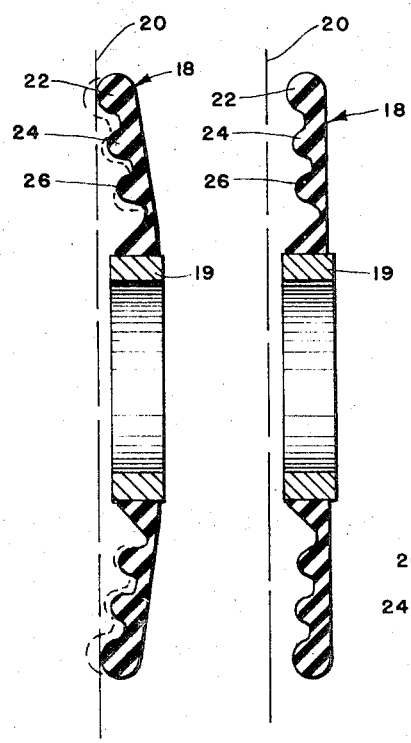
FIG. 2 is a cross sectional view showing a contact face of the wall of the pump housing in dashed outline, showing the normal, unrestrained position of the elastomer seal in dashed outline, and showing the elastomer seal in full outline in the restrained operating position.
FIG. 3 is a view similar to FIG. 2, but shows the seal as extended outwardly by centrifugal force and out of contact relation with the housing.

The seal 18 performs in the same manner as the seal set out in the aforementioned patent to Thompson, except at speeds intermediate the full rated speed and static condition leakage occurs, as it does at certain times when the pump is not running at its rated speed. Therefore, when running at less than its rated running at a seal will not attain position as shown in FIG. 3, due to the fact that the centrifugal force will be insufficient to maintain the seal in this position.

Figure 4:
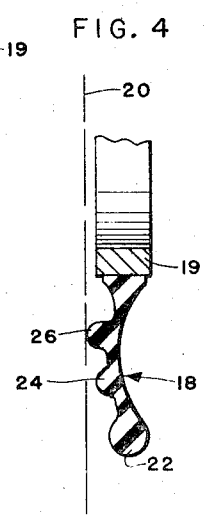
FIG. 4 is a fragmentary, sectional view showing the innermost of the annular ribs in contact sealing relation, with the inner wall of the housing, which is a position attained before the rated RPM is attained, and showing how the pressure reacts on the side of the elastomer seal opposite the rib to form a seal with the wall of the housing.
Figure 5:
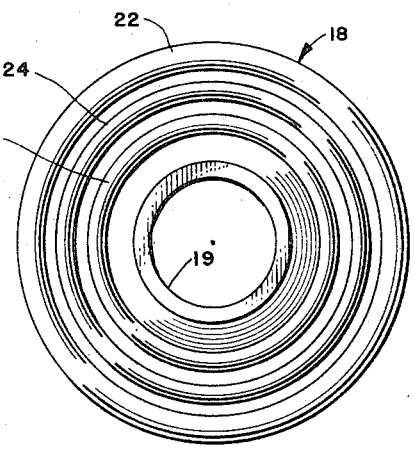
FIG. 5 is a front elevational view of the elastomer seal showing three annular ribs thereon.

The elastomer seal 18 has an outer annular rib 22, an intermediate annular rib 24 and an inner annular rib 26. The resiliency of the elastomer material in the seal 18 is such that it must be deformed from the position as shown in dashed outline in FIG. 2, to that shown in full outline in FIG. 2, so that lateral face of the outer annular rib 22 will be in contact sealing relation with the complementary plane face 20 of plate 21 when the seal is in static condition; however, pressure on the opposite face of the seal 18 is such that a centrifugal force and pressure tend to move the seal 18 into the position as shown in FIG. 4. When the pump is at a at speed at which the pressure will urge the rib 26 into contact relation with face 20 of plate 31, the rib will take the wear, thereby prolonging the life of the seal. The pressure will urge inner annular rib 26 into sealing relation with face 20 of the wall of pump housing 1, as shown in FIG. 4, before the seal attains the rotational speed to hold it in the position as shown in FIG. 3. Therefore, the annular rib 26 takes over as a sealing rib and as the centrifugal force tends to urge the seal into the position as shown in FIG. 3, the annular rib 24 then comes into sealing relation with the face 20. When the centrifugal force causes the seal to attain the position as shown in FIG. 3, the seal and pump impellers 12 and 14 will direct the liquid within the housing outward to form a liquid seal 40 which will prevent liquid passing through opening 28 which surrounds shaft 8, however, the housing 2 has a further seal 30 which is of the same character as seal 18 and operates in the same manner to prevent leakage of fluid out through opening 32 in plate 31 of housing 2 through which shaft 8 passes. The housing 2 is partially filled with a liquid, such as water or oil, which liquid is being pumped by the centrifugal pump, this liquid forms a peripheral seal 40 with the impeller plate, generally designated by the numeral 34, which impeller plate 34 has vanes 36 and 38 on the sides thereof. This impeller will prevent air from being sucked through hole 32 into the housing of centrifugal pump, and will therefore form an annular fluid seal, designated by the numeral 40, as indicated in dotted outline, FIG. 1, within housing 2. This liquid is circulated through pipes 44 and 46 by centrifugal force. A drain is provided through gated outlet 42, so when the liquid becomes contaminated with mud or the like it can be drained out. This seal performs the same functions as seal 18 and, as the speed of rotation of shaft 8 slows, the ribs 24 and 26 will be forced into contact with plane face of plate 31 of the housing 2 by pressure from the back side of the seal 30, until the shaft 8 comes to rest, at which time the seal will attain the position as shown in FIGS. 1 and 2.

The annular ribs 24 and 26 each serve to form a wear surface as the pump attains its rated speed or slows from this speed to a static condition to prevent the seals 18 and 30 from becoming worn intermediate the outer annular rib 22 and the sleeve 19 to which the seal 18 is bonded.

In operation, the pipes 44 and 46 connect to a tank of liquid so as to circulate the liquid through the tank, as the pipe 44 enters the chamber of housing 2, radially inward from the position of pipe 46. Therefore, a centrifugal pumping action is had. For other characteristics of the pump, reference is had to the above mentioned patent.

The elastomer seals 18 and 30 each have a reduced cross-sectional area of the elastomer seal intermediate the innermost annular rib and the shaft, in which seal an annular groove is formed. This annular groove is of less cross-sectional area than any of the other grooves on said elastomer seals, so, when pressure is applied to the face of the elastomer seal opposite said annular ribs 22, 24 and 26, the elastomer seals 18 and 30 will become deformed so if the seal is not rotating at a speed which will maintain the elastomer seals 18 and 30 in the position as shown in FIG. 3, by centrifugal force, the pressure will first urge annular rib 26 against the face or surface 20 and with the seal being rotated less than the necessary speed to maintain the ribs out of engagement with the respective end plates 21 and 31, the rib 26 will present a wear surface on the seal so as to extend the life of the seal over a long period of time.

If the seal is rotated sufficiently fast to cause the rib 26 to disengage, the rib 24 then engages and presents a wear surface, which will further prolong the life of the seal. Therefore, it is to be pointed out that the ribs 24 and 26 are presented as improvements over the Thompson et al. U.S. Pat. No. 3,028,181.

What is claimed is:

1. A seal for a rotating shaft, which seal comprises;
  a. an impeller housing,
    1. first and second end plates secured to the respective ends of said impeller housing,
    2. each said end plate having an opening formed therein axially thereof,
  b. a rotatable shaft mounted within said impeller housing and extending through said openings in said end plates,
    1. the longitudinal axis of said shaft being coincident with the longitudinal axis of said housing,
  c. a first cupped elastomer seal secured to said shaft within said housing and having its concave portion facing the first end plate, 1. said elastomer seal being in fluid tight relation with the shaft and rotating therewith,
2. said elastomer seal having an outer annular rib formed thereon, which rib engages said first end plate when said shaft is static, thereby forming a seal between the shaft and the first end plate,
3. an innermost annular rib formed on the elastomer seal and being spaced radially outward from said shaft, on the cupped side of said elastomer seal, and inwardly a substantial distance from said outermost annular rib,
4. said elastomer seal having an annular groove formed therein, on the cupped side thereof, intermediate the innermost annular rib and said shaft, which annular groove reduces the cross-sectional area of said elastomer seal, so when the elastomer seal is not rotating at a speed sufficiently fast to maintain the seal out of engagement with said first end plate, by centrifugal force, and when the fluid pressure is such on the elastomer seal on the side opposite from the innermost rib, the innermost rib will be moved inward into contact relation with said first end plate to form a seal therewith and present a wear surface to prolong the life of the seal, d. a second cupped elastomer seal secured to said shaft within said housing and having its concave portion facing the second end plate,
1. said elastomer seal being in fluid tight relation with said shaft and rotating therewith,
2. said second elastomer seal having an annular rib formed thereon which engages said second end plate, when the shaft is in static condition, thereby forming a seal between the shaft and the second end plate,
3. an inner most annular rib formed on the elastomer seal and being spaced radially outward from the shaft, on the cupped side of said elastomer seal and inwardly a substantial distance from said outermost annular rib,
4. said elastomer seal having an annular groove formed therein on the cupped side thereof, intermediate the innermost annular rib and said shaft, which annular groove reduces the cross-sectional area of said elastomer seal, so when said elastomer seal is not rotating at a speed sufficiently fast to maintain the seal out of engagement with said second end plate, by centrifugal force, and when the fluid pressure is such on the elastomer seal on the side opposite from the innermost annular rib, the innermost annular rib will be moved inward into contact relation with said second end plate to form a seal therewith and to present a wear surface to prolong the life of the seal, e. the first end plate having at least one opening formed therein between the axial opening therein and the wall of the housing,
1. a conduit in communication with said opening formed in said first end plate and connecting with a source of liquid supply to facilitate the flow of liquid through the opening to thereby fill the impeller housing with liquid, f. an impeller mounted on said shaft within said impeller housing,
1. said impeller being in close fitting relation with the shaft to prevent leakage of liquid thereby,
2. said impeller extending outwardly into close proximity to the wall of the housing, g. the outermost annular rib of the first and second elastomer seals adapted to move out of engagement with the first and second end plates respectively, by centrifugal force, when the shaft is rotated at a predetermined speed, thereby eliminating friction between the outermost annular ribs of the respective elastomer seals and the respective end plates,
1. a portion of the liquid within the housing being expelled through the opening intermediate the axial opening and the wall of the housing and to a conduit leading outwardly therefrom, and
2. the remaining portion of the liquid within the housing being forced radially outward, thereby forming an annular liquid seal between the impeller and the housing wall, when the shaft is rotated at said predetermined speed, thereby preventing leakage of fluid through the axial opening in the second end plate of the impeller housing.

2. A seal for a rotating shaft, as defined in claim 1; wherein
a. a third annular rib is formed on the cupped side of each said elastomer seal intermediate said outermost annular rib and said innermost annular rib to engage the respective end plates, after said innermost annular ribs have moved out of engagement with the respective innermost plane faces of said end plates so as to present a wear surface to prolong the life of the seal, when fluid pressure is exerted on the side of the seal opposite said cupped side.

* * * * *